UNITED STATES PATENT OFFICE.

FRANCIS W. HIGGINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ABRASIVE ARTICLE.

978,747.            Specification of Letters Patent.      Patented Dec. 13, 1910.

No Drawing.      Application filed February 28, 1907. Serial No. 359,934.

*To all whom it may concern:*

Be it known that I, FRANCIS W. HIGGINS, of Niagara Falls, Niagara county, New York, have invented a new and useful Abrasive Article, of which the following is a full, clear, and exact description.

My invention relates to the manufacture of abrasive bodies or articles, of the type wherein abrasive material is combined with a vitrified binder. Heretofore the materials commonly used for the binder, such as feldspars, quartz, clays, &c., have contained as fluxing ingredients the oxids of metallic elements. The mixtures have been so made and proportioned with regard to the flux content, such as oxids of iron, calcium, magnesium, sodium and potassium, that a certain degree of vitrification will be obtained at the kiln temperature.

My invention is designed to give a stronger binding action, and a strong and durable article; and it is based upon my discovery that a fluxing substance containing fluorin will give greatly improved results in the binder. The fluorin will ordinarily be used in the form of a fluorid or fluorids in the mixture. The amount of fluorid which is desirable will vary with the use to which the abrasive article is intended, with the abrasive used, &c.; but for general purposes the following proportions may be taken:—granular abrasive, 76.00 per cent.; pulverized quartz, 12.25 per cent.; kaolin, 8.25 per cent.; calcium fluorid, 1.00 per cent.; sodium-aluminum fluorid, 2.50 per cent.

In making the article, I preferably pulverize the materials of the binder, mix them with the abrasive material in a granular or powdered condition, and then moisten the mixture to about the consistency of molding sand. The mixture may then be molded into the desired shape and fired in a potter's kiln. The temperature may be raised to any desirable degree, but preferably about 2,700 degrees Fahrenheit.

The use of the fluorin compound or salt in the binder is especially valuable in making abrasive articles of carborundum. Where the ordinary ceramic binder is used, in which the fluxes are basic oxids, I believe that the chemical union between the binder components is not sufficiently strong to prevent a reaction occurring at the kiln temperature, between the abrasive material and one or more of the binder materials, if the abrasive is of a character having a tendency to react thereon. This has a tendency to occur during the firing process in making carborundum articles, thus deteriorating the bond. I believe that the beneficial action of the fluorids or fluorin compounds replacing the basic oxids or ordinary fluxes, in whole or in part, is due to the fact that a binder is produced in which the chemical affinity of its elements is stronger than the affinities between the binder materials and the carborundum, at any temperature reached during firing. My invention, however, is not limited to this theory of action, but is based upon the improved results in the article obtained by the use of the fluorin compounds.

Many changes may be made in the abrasive material employed, the particular composition of the binder, &c., without departing from my invention, since I consider myself the first to employ a binder having fluorin as one of its constituents, for making abrasive articles.

The invention may also be applied to the manufacture of any ceramic body of refractory material, whether the refractory material is an abrasive or not, though it is particularly designed for abrasive substances.

I claim:—

1. A carborundum article composed of carborundum and a vitrified binder, one of the constituents of said binder being fluorin.

2. An abrasive article composed of abrasive material and a vitrified binder, one of the constituents of said binder being an alumino-silicate containing fluorin.

3. An abrasive article composed of abrasive material and a vitrified binder, one of the constituents of said binder being an alkaline alumino-silicate containing fluorin.

4. An abrasive article composed of abrasive material and a vitrified binder, one of the constituents of said binder being an alkaline earth alumino-silicate containing fluorin.

5. As a new article of manufacture, an abrasive article composed of abrasive material and a vitrified binder formed from a mixture of ferrous kaolin, calcium fluorid and sodium aluminum fluorid.

In testimony whereof, I have hereunto set my hand.

FRANCIS W. HIGGINS.

Witnesses:
F. J. TONE,
ASHMEAD G. ROOT.